United States Patent [19]

Hixon

[11] Patent Number: 5,473,918
[45] Date of Patent: Dec. 12, 1995

[54] LOCKING DEVICE FOR GEARSHIFT

[76] Inventor: Frank E. Hixon, P.O. Box 298, Oakhurst, Okla. 74050

[21] Appl. No.: 77,052

[22] Filed: Jun. 16, 1993

[51] Int. Cl.⁶ ............................. G05G 5/06; E05B 65/12; B60R 25/06
[52] U.S. Cl. ................... 70/202; 70/247; 70/238; 180/287
[58] Field of Search ..................... 180/287; 70/237, 70/238, 158, 201, 202, 181, 183, 247, DIG. 32, 245, 246, 248

[56] References Cited

U.S. PATENT DOCUMENTS

| 986,537 | 3/1911 | Ashton . | |
|---|---|---|---|
| 992,444 | 5/1911 | Parker et al. . | |
| 1,061,943 | 5/1913 | Johnstone . | |
| 1,235,863 | 8/1917 | Weissel . | |
| 1,334,987 | 3/1920 | Larpenter | 70/212 |
| 1,563,072 | 5/1925 | Bryant . | |
| 1,669,924 | 5/1928 | Blood . | |
| 1,853,036 | 4/1932 | Briggs | 70/247 |
| 4,693,099 | 9/1987 | Cykman | 70/247 |
| 4,825,670 | 5/1989 | Snow . | |
| 5,063,763 | 11/1991 | Johnson | 70/34 |
| 5,125,249 | 6/1992 | Fields et al. | 70/247 |

Primary Examiner—Darnell M. Boucher
Attorney, Agent, or Firm—William S. Dorman

[57] ABSTRACT

A locking device for the gearshift lever of a large truck, the gearshift lever being of the type which extends vertically upwardly through an opening in the floorboard of the truck, the locking device comprising a sleeve surrounding and firmly engaging a lower portion of the gearshift lever, the sleeve being provided with a vertical bore, a vertical locking rod being slidably mounted in the vertical bore, the locking rod having a lower end which projects below the floorboard when the rod is in its lowermost position, a horizontal locking plate attached below the floorboard and having a portion extending into the opening, the locking plate having a locking hole therethrough for receiving the lower end of the locking rod when the latter is in its lowermost position, a rotatable lock mounted on the sleeve and having a rotatable shaft therein, the locking rod being provided with a notch adjacent the upper end thereof, the lock shaft being provided with a semi-circular extension which is received in the notch when the rod is in its lowermost position.

4 Claims, 2 Drawing Sheets

LOCKING DEVICE FOR GEARSHIFT

FIELD OF THE INVENTION

The present invention relates to a locking device for a gearshift, and more particularly a locking device for a gearshift lever on large trucks.

THE PRIOR ART

It is well recognized that it is difficult to start diesel trucks in cold weather. As a result, many truck drivers will leave the ignition running, with the cab locked, when the driver is at a truck stop. On the other hand, it frequently occurs that someone will break into the cab and steal the truck.

The present invention is a cylindrical sleeve which will attach to the shift lever of the truck and lock the shift lever when the latter is in the "neutral" position.

A preliminary search was conducted in the U.S. Patent Office and the following references were uncovered in the search:

| | | |
|---|---|---|
| 986,537 | 1,235,863 | 4,825,670 |
| 992,444 | 1,563,072 | |
| 1,061,943 | 1,669,924 | |

Ashton U.S. Pat. No. 986,537 shows a device for locking the shift lever in the "neutral" position; Parker, et al. U.S. Pat. No. 992,444 shows a device for locking the shift lever by means of attachment to the floorboard; Johnstone U.S. Pat. No. 1,061,943 shows a device for locking the transmission in the "neutral" position; Weissel U.S. Pat. No. 1,235,863 shows a device for locking the gearshift preferably in "reverse" position; Blood U.S. Pat. No. 1,669,924 shows another transmission lock; Bryant U.S. Pat. No. 1,563,072 shows a lock designed to operate in conjunction with the transmission; and Snow U.S. Pat. No. 4,825,670 shows a vehicle shift lock which also has a portion which covers the face of the vehicle's radio.

SUMMARY OF THE INVENTION

The present invention involves a locking device for the gearshift lever of a large truck, the gearshift lever being of the type which extends vertically upwardly through an opening in the floorboard in a forward cabin of the truck. The locking device comprises a sleeve surrounding a lower portion of the gearshift lever in a position above the floorboard of the truck. The sleeve consists of a U-shaped member and a flat vertical block which, when placed together, surround the gearshift lever. Set screws are provided for locking the sleeve against the gearshift lever. The vertical block is provided with a vertical bore and a vertical locking rod is slidably mounted in the vertical bore. The locking rod has an upper end attached to a horizontal plate which is movable with the rod, the horizontal plate being provided with a downwardly projecting vertical positioning pin. The vertical block has a positioning hole adapted to receive the positioning pin when the locking rod is in its lowermost position. The locking rod has a lower end adapted to project below the floorboard when the rod is in its lowermost position. A horizontal locking plate is attached to the floorboard along the underside thereof and has a portion extending into the opening in the floorboard surrounding the gearshift lever. The locking plate has a locking hole therethrough for receiving the lower end of the locking rod when the latter is in its lowermost position. The orientation of the sleeve, locking plate and locking rod is such that the locking rod engages the locking plate when the gearshift lever is in a "neutral" position for locking the gearshift lever in this position. A rotatable lock is mounted in the vertical block and has a rotatable shaft. The locking rod is provided with a notch adjacent the upper end thereof. The lock shaft, on the other hand, is provided with a semi-circular extension which is adapted to be received in the notch when the rod is in its lowermost position. The upper end of the bore is provided with a circular enlargement and a compressible spring mounted at the upper end of the locking rod, below the horizontal plate, is adapted to be received in the circular enlargement when the locking rod is in its lowermost position.

DETAILED DESCRIPTION OF THE PREFERRED EMBODIMENTS

Figure 1:
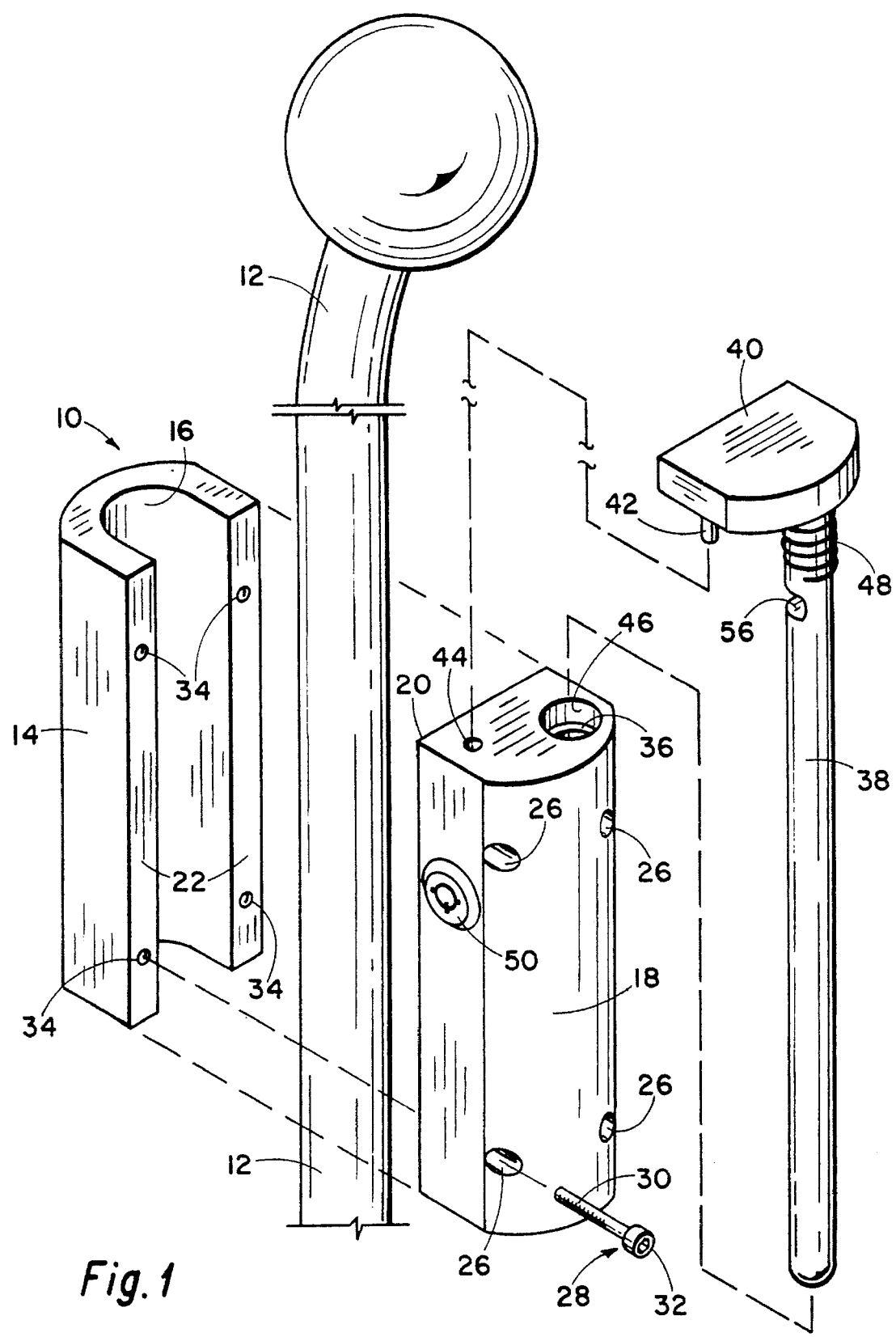
FIG. 1 is an exploded view of the locking device shown in relation to a portion of the gearshift of a truck.
Figure 4:
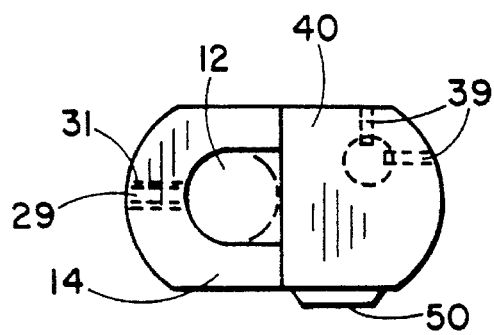
FIG. 4 is a plan view of the locking device shown in FIG. 3.
Figure 2:
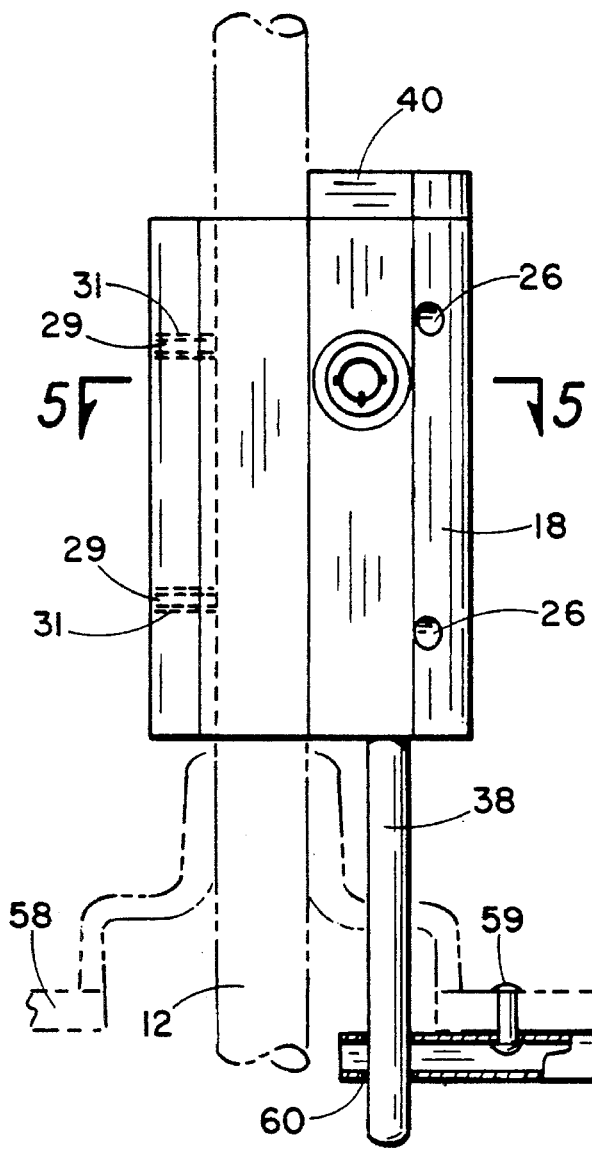
FIG. 2 is a front elevation, with certain parts in phantom, of the locking device in its locked position.
Figure 3:
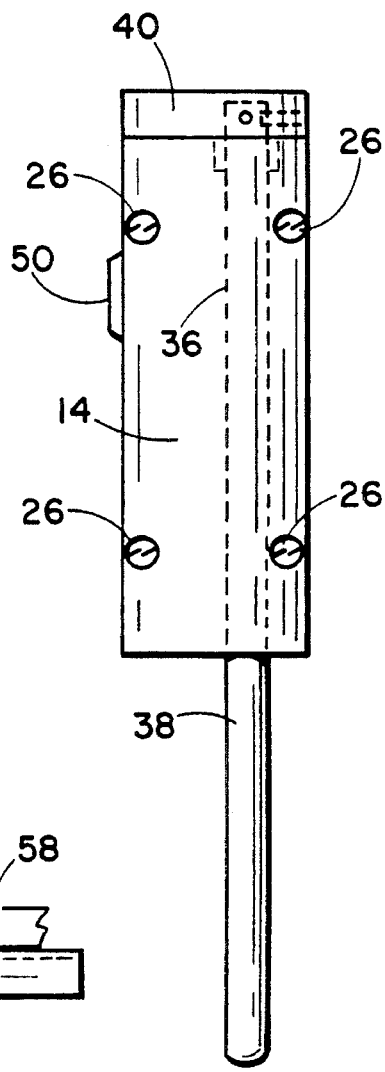
FIG. 3 is a right-hand side elevation of the locking device shown in FIG. 2.

Referring to the drawings in detail, FIGS. 1 and 2 show a sleeve 10 which is adapted to be attached to the shift lever 12 of a diesel truck (not shown). The sleeve 10 is formed of two portions, a U-shaped portion 14 having a U-shaped channel 16 and a mating portion, or vertical block, 18 having a flat vertical side 20 adapted to mate with the flat ends 22 on the side of the member 14 opposite from the curved portion thereof. The outer surface of the member 14 is preferably curved as shown. The vertical block 18 has four horizontal holes 26 whose outer ends are enlarged and countersunk. A bolt 28 having a threaded portion 30 and a head 32 is adapted to be received in each of the holes 26. The threaded ends 30 of the bolts 28 are adapted to threadedly engage threaded openings 34 in the flat ends 22 of the sleeve 16. When the bolts 28 are turned as far as they can go, the sleeve 10 consisting of the U-shaped member 16 and the vertical block 18 will closely surround the gear lever 12. The U-shaped member 16 is provided with a pair of vertically spaced holes 31 in which a pair of set screws 29 are threadedly received. When the sleeve 10 is properly positioned around the gearshift 12, the set screws 29 are tightened to lock the sleeve in position. Before tightening the set screws 28, however, it is necessary to insure that the sleeve is properly oriented with respect to the locking plate, as will hereinafter appear.

Figure 5:
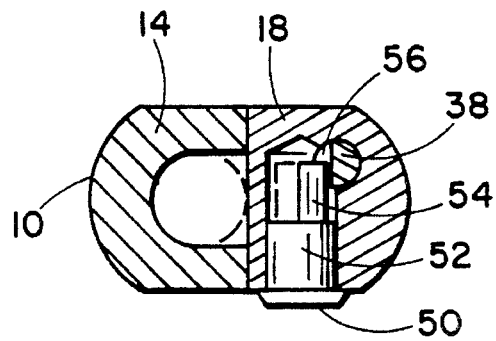
FIG. 5 is a cross-sectional view taken along Section line 5—5 of FIG. 2.

The vertical block 18 has a vertical bore 36 extending vertically therethrough so as to accommodate a vertical rod 38. The upper end of the rod attaches to a horizontal plate 40 by means of a pair of horizontal pins 39 which pass through holes in the plate 40 and into holes in the upper end of the rod 38. The horizontal plate has a vertical pin 42 which is adapted to be received in a vertical opening 44 in the upper surface of the vertical block 18. The upper end 46 of the bore 38 is enlarged so as to accommodate a spring 48 which surrounds the upper end of the rod 38. When the rod is received in the bore 36 and pushed downwardly, such that the pin 42 is received in the hole 44 and the lower surface of the plate 40 rests against the upper surface of the vertical block 18. The vertical block 18 is provided with a lock 50 which requires a special key (not shown) to turn the shaft 52. The inner end of the shaft 52 is provided with a semi-circular extension 54 which is adapted to be received in a notch 56 in the upper end of the rod 38 when the rod is in its "locked" position. Turning the lock 50 to the dotted line position shown in FIG. 5 will release the rod and allow the same to move upwardly under the action of the spring 48.

As best shown in FIG. 2, the locking device of the present invention includes one additional element, namely a locking plate 56 which is riveted to the underside of the floorboard 58 by means of pop-rivets 59. The locking plate 56 is provided with an opening 60 through which the rod 38 protrudes when it is in the locked position, as shown in FIG. 2. If one were to attempt to move the gearshift lever 12 from the "neutral" position represented by FIG. 2, he would be unable to do so because the rod 38 is locked in the locking plate 60. If, however, the driver of the truck returns to his vehicle, he merely inserts a special key in the lock 50 and turns the same 90° to 180° so that the rod 38 lifts upwardly out of the hole 60 under the action of the spring 48.

In order to insure that the sleeve 10 and associated locking rod 38 are tamper proof, the various holes 26 and 31 are filled in at the ends (after their respective screws have been tightened) with some suitable alloy which would be extremely difficult to remove or drill out. Also, the main components, the U-shaped member 14 and the vertical block 18 are preferably made out of aluminum alloy #319, which is extremely difficult to grind or saw.

When the truck driver wishes to lock his gearshift in the "neutral" position, he first ascertains that the gearshift lever is in fact in the "neutral" position, then he pushes down on the plate 40 so that the pin 42 goes into the hole 44 and the spring 48 is compressed in the bore 36. At the same time, the lower end of the rod 38 will pass through the hole 60 in the locking plate 56. At this time, the truck driver will turn the lock 50 so that the semi-circular extension 54 is received in the notch 56. The truck driver now releases pressure from the plate 40 and removes the key from the lock. He is now free to go wherever he wishes, leaving the engine on and his truck secure from theft.

When the truck driver returns to his cab, he inserts the key in the lock 50 and turns the same until the extension 54 is no longer received in the notch 56, at which time the rod 38 will move upwardly under the action of the spring 58. At this time the gearshift lever 12 is no longer locked. If it is desired to limit the amount of upward movement of the rod 38, the latter can be provided with a vertical slot (not shown) which will interact with a set screw (not shown) passing through the body of the block 18 and in engagement with this vertical slot.

Whereas, the present invention has been described in particular relation to the drawings attached hereto, other and further modifications, apart from those shown or suggested herein, may be made within the spirit and scope of this invention.

What is claimed is:

1. A locking device kit for a gearshift lever of a large truck, the gearshift lever extending vertically upwardly through an opening in a floorboard in a forward cabin of the truck, the locking device kit comprising a sleeve adapted to surround and firmly engage a lower portion only of the gearshift lever in a position above the floorboard of the truck, means for locking the sleeve against the gearshift lever, the sleeve being provided with a vertical bore, a vertical locking rod being slidably mounted in the vertical bore, the locking rod having an upper end attached to a horizontal plate which is movable with the rod, the locking rod having a lower end adapted to project below the floorboard when the rod is in its lowermost position, a horizontal locking plate adapted to be attached to the floorboard along an underside thereof and having a portion extending into the opening in the floorboard surrounding the gearshift lever, the locking plate having a locking hole therethrough for receiving the lower end of the locking rod when the latter is in its lowermost position, the orientation of the sleeve, locking plate and locking rod being such that the locking rod engages the locking hole when the gearshift lever is in a "neutral" position for locking the gearshift lever in this position, a rotatable lock mounted in the sleeve and having a rotatable shaft, the locking rod being provided with a notch intermediate the ends thereof, the lock shaft being provided with a semi-circular extension which is adapted to be received in the notch when the rod is in its lowermost position.

2. A locking device kit as set forth in claim 1 wherein the sleeve comprises a U-shaped portion having a U-shaped channel for surrounding the gearshift lever and a vertical block having a flat vertical side, the U-shaped portion having a curved portion on one side thereof and a pair of flat ends on a side opposite from the curved portion, the flat ends being adapted to mate with the flat vertical side of the vertical block, and means for connecting the vertical block to the flat ends of the U-shaped portion so as to closely surround the gearshift lever.

3. A locking device kit according to claim 1 wherein the means for locking the sleeve against the gearshift lever comprise a pair of set screws passing through horizontal threaded openings in the sleeve and engageable with the gearshift lever whereby turning of the set screws will lock the sleeve against the gearshift lever.

4. A locking device kit according to claim 1 wherein the upper end of the bore is provided with a circular enlargement, a compressible spring mounted at the upper end of the locking rod below the horizontal plate and adapted to be received in the circular enlargement when the locking rod is in its lowermost position, whereby, when the lock is rotated so that the semi-circular extension is no longer received in the notch, the rod will be lifted under the action of the spring so that the lower end of the rod is no longer received in the locking hole.

* * * * *